(12) United States Patent
Folkers et al.

(10) Patent No.: US 7,582,986 B2
(45) Date of Patent: Sep. 1, 2009

(54) COMPENSATED INVERSE-TIME UNDERVOLTAGE LOAD SHEDDING SYSTEMS

(75) Inventors: Ralph W Folkers, Pullman, WA (US); Jeffrey B Roberts, Viola, ID (US); Edmund O Schweitzer, III, Pullman, WA (US); Armando Guzman-Casillas, Pullman, WA (US); Gabriel Benmouyal, Longueuil (CA)

(73) Assignee: Schweitzer Engineering Laboratories, Inc., Pullman, WA (US)

(*) Notice: Subject to any disclaimer, the term of this patent is extended or adjusted under 35 U.S.C. 154(b) by 334 days.

(21) Appl. No.: 10/961,425

(22) Filed: Oct. 8, 2004

(65) Prior Publication Data

US 2006/0077605 A1 Apr. 13, 2006

(51) Int. Cl.
*G05D 11/16* (2006.01)
*H02J 3/14* (2006.01)

(52) U.S. Cl. ......................... 307/39; 700/293
(58) Field of Classification Search .............. 307/38, 307/33, 80; 700/293
See application file for complete search history.

(56) References Cited

U.S. PATENT DOCUMENTS

| | | | |
|---|---|---|---|
| 3,829,669 A * | 8/1974 | Haley et al. ............... | 703/18 |
| 4,245,319 A | 1/1981 | Hedges | |
| 4,246,623 A | 1/1981 | Sun | |
| 4,348,668 A | 9/1982 | Gurr | |
| 4,368,500 A | 1/1983 | Conroy | |
| 4,511,979 A | 4/1985 | Amirante | |
| 4,612,619 A | 9/1986 | Culp | |
| 4,642,724 A | 2/1987 | Ruta | |
| 4,717,985 A | 1/1988 | Demeyer | |
| 4,916,573 A | 4/1990 | Ruta | |
| 5,073,724 A * | 12/1991 | Fox ............................. | 327/74 |
| 5,325,061 A * | 6/1994 | Schweitzer, III ............ | 324/522 |
| 5,534,734 A | 7/1996 | Pugh | |
| 5,798,939 A | 8/1998 | Ochoa et al. | |
| 5,995,911 A * | 11/1999 | Hart ........................... | 702/64 |
| 6,219,591 B1 * | 4/2001 | Vu et al. ..................... | 700/286 |
| 6,249,719 B1 * | 6/2001 | Vu et al. ..................... | 700/292 |

(Continued)

OTHER PUBLICATIONS

Kundur, Prabha, Power System Stability And Control, EPRI, Power System Engineering Series, McGraw Hill, Inc. 1994.

(Continued)

*Primary Examiner*—Albert W Paladini
*Assistant Examiner*—Michael Rutland Wallis
(74) *Attorney, Agent, or Firm*—Eugene M. Cummings, P.C.

(57) ABSTRACT

Provided is a compensated inverse-time undervoltage load shedding system and method for use in an electrical power system. The compensated inverse-time undervoltage load shedding system includes a compensation element for determining a compensated value and an inverse-time undervoltage element operatively coupled to the compensation element and enabled based on the compensated value. When enabled, the inverse-time undervoltage element calculates a load shedding time delay value based on the compensated value, and determines a load shedding signal based on the load shedding time delay value. An associated load of the electrical power system is shed based on the load shedding signal. The compensation element may determine the compensated value using a voltage magnitude, a rate-of-change of power system voltage over time, a weighted rate-of-change of power system voltage over time, a current magnitude, a weighted current magnitude, and an impedance phasor value, to name a few.

38 Claims, 6 Drawing Sheets

U.S. PATENT DOCUMENTS

| | | | |
|---|---|---|---|
| 6,314,378 B1 | 11/2001 | Hodge | |
| 6,476,521 B1 * | 11/2002 | Lof et al. | 307/105 |
| 7,242,114 B1 * | 7/2007 | Cannon et al. | 307/129 |
| 2004/0254688 A1 | 12/2004 | Chassin | |

OTHER PUBLICATIONS

Undervoltage Load Shedding Task Force, Undervoltage Load Shedding Guidlines, Jul. 1999.

van der Merwe; Clote; Fischer.; Implementation Of An Unconventional Voltage Slide Scheme, In Proc. 31st Annual Western Protective Relay Conf. Spokane, WA 10/19-21/04 pp.1-25.

Verbic, Gregor; Gubina, Ferdinand; A Novel Scheme Of Local Protection Against Voltage Collapse Based On The Apparent-Power Losses, Electrical Power and Energy Systems 26 2004.

Bergovic; Milosevic; Novosel; A Novel Method For Voltage Instability Protection, The 35th Hawaii International Conference on System Science—2002.

Taylor, C.W., Concepts Of Undervoltage Load Shedding For Voltage Stability, IEEE Trans. on Power Delivery, vol. 7, No. 2, pp. 480-488, Apr. 1992.

Moors, C.; Cutsems, T.V.; Determination Of Optimal Load Shedding Against Voltage Instability, in Proc. 13th PSCC, Trondheim, Norway, Jun.-Jul. 1999.

M. Begovic, et al., Summary Of "System Protection And Voltage Stability", IEEE Trans. On Power Delivery, vol. 10. No. 2, Apr. 1995.

A. Guzman, et al., "Local And Wide-Area Network Protection Systems Improve Power System Reliability", Sep. 2004 (available at: <http://www.selinc.com/techpprs/SEL_Guzman_LocalWide-Area_6178_20040928.pdf>).

* cited by examiner

COMPENSATED INVERSE-TIME UNDERVOLTAGE LOAD SHEDDING SYSTEMS

BACKGROUND OF THE INVENTION

The present invention generally relates to undervoltage load shedding systems for alleviating or preventing system-wide power system voltage collapses and, more specifically, to a time undervoltage load shedding system having a compensated input inverse-time undervoltage element.

Electric utility companies are responsible for maintaining voltage and frequency stability for the area under their control. To achieve this stability, the power utility companies are designed with apparatus and procedures that react to unexpected occurrences of increased or decreased power system voltage levels. Such apparatus and procedures are used to maintain frequency and voltage excursions within acceptable limits under both normal and abnormal operating conditions, without exceeding the thermal limits of the power system components.

Events that contribute to voltage instability of the power system may include, for example, a VAR (voltage-amperes reactive) generating source reaching its operability limits, the loss of a VAR generating source, a decrease of effective transformer turns ratios, a heavy power system loading that approaches or exceeds the power system's limits, and/or tripping of transmission lines and/or generators. In most cases, however, a lone event does not lead to power system voltage collapse. Instead, a sequence of events typically causes the voltage instability which may cascade into localized or widespread system voltage collapse. Accordingly, a voltage collapse may be defined as a process by which voltage instability leads to post-disturbance equilibrium voltages below acceptable limits across one or more portions of a power system or grid.

A primary means of maintaining power system voltage stability includes ensuring that sufficient reactive power reserves are available to maintain nominal power system voltage. Other means include raising a point-of-use voltage to reduce the magnitude of a load current induced voltage drop, increasing generator(s)output voltage via generator controls, and/or decreasing one or more loads served by the power system via tripping the load(s) off-line (i.e., temporarily disconnecting the load(s) from the power system). Tripping a load off-line in response to a power system undervoltage condition is herein referred to as load shedding.

Prior to load shedding, the power system may attempt to adjust an undervoltage condition using first stage corrective actions such as energizing shunt capacitors at or near load centers, activating synchronous condensers, energizing previously de-energized lines from a single source, and/or placing VAR generation sources on-line. Moreover, automatic controls such as load-tap changers (LTCs), placed on the load distribution side of a power transformer of the power system, may be used to dynamically change load transformer turn ratios during periods of voltage instability.

Despite such first stage corrective actions, voltage instability may continue until power system voltage collapse and/or rotor angle instability (i.e., generator loss of synchronism). As a result, load shedding may be necessary.

The simplest undervoltage load-shedding (UVLS) schemes include undervoltage detectors, referred to as undervoltage relays, that act to trip a load off-line (i.e., shed the load from the power system) some predetermined time period after the measured system voltage falls below a preselected voltage level, or threshold. If the measured system voltage does not remain below the pre-selected voltage threshold for longer than the predetermined time period, the undervoltage relay does not shed the associated load. This method of undervoltage load shedding is hereafter referred to as definite time delay undervoltage load shedding.

While effective in some cases, utilizing definite time undervoltage relays for load shedding purposes has several drawbacks. First, because each definite time undervoltage relay includes a timer having one predetermined time period, or interval, and one preselected voltage threshold, loads may be unnecessarily shed. For example, if two identical definite time undervoltage relays having a 2 second preset time interval and a 0.9 per unit nominal voltage magnitude threshold are each coupled to a power circuit breaker associated with a different load, and the power system voltage measured by each time undervoltage relay drops below the 0.9 per unit nominal voltage for 2 seconds, the respective definite time undervoltage relays will cause the coupled power circuit breakers to shed their associated loads, regardless of the load's proportionate contribution to the undervoltage condition. In that case, it may have only been necessary to shed the load drawing the most reactive power rather than shedding both loads.

In other words, any and all loads associated with definite time undervoltage relays meeting the preset time and voltage criteria will be shed. As a result, dynamic loads such as induction motors, load-tap changers and thermostatic loads demanding more reactive power from the system are not necessarily shed before static loads demanding less reactive power from the system. A better load shedding scheme would shed just enough loads to ensure that the power system recovers to its nominal operating voltage.

To reduce the likelihood that a particular load will be shed unnecessarily, undervoltage load shedding elements that do not rely on predetermined time period delays have been utilized. Such undervoltage load shedding elements, hereinafter referred to as inverse time undervoltage load shedding relays, calculate a tripping time, or load shedding time delay, that is a function of measured power system voltage at a particular bus. As a result, the load shedding time delay can vary.

For example, an inverse time undervoltage relay such as an IAV54E Undervoltage Relay manufactured by General Electric Co. may be configured to cause a load to be shed when the measured power system voltage drops below 0.85 per unit nominal voltage for longer than 17 seconds. However, if the measured voltage drops below 0.80 per unit nominal voltage, the inverse time undervoltage relay will act to cause the load to shed in about 14 seconds. Thus, as the power system voltage measured by the relay decreases so does the load shedding time delay.

Although less likely to unnecessarily shed a load than the definite time undervoltage relay, the inverse time undervoltage relay may still unnecessarily shed a load if, for example, power system recovery to nominal operating voltage is slow. An ideal load shedding system would identify the loads demanding the most reactive power and shed those loads first, thereby minimizing the number of loads that are shed until the power system voltage recovers to its nominal operating voltage level.

Therefore, it is an aspect and object of this invention to provide a load shedding system which avoids one or more of the drawbacks of prior load shedding systems.

SUMMARY OF THE INVENTION

Disclosed is a compensated inverse-time undervoltage load shedding system and method for an electrical power system. Generally, the compensated inverse-time undervoltage load shedding system includes a compensation element for determining a compensated value and an inverse-time undervoltage element operatively coupled to the compensation element and enabled based on the compensated value. When enabled, the inverse-time undervoltage element calculates a load shedding time delay value based on the compensated value and then determines a load shedding signal based on the load shedding time delay value. An associated load of the electrical power system is shed based on the load shedding signal. The compensation element may determine the compensated value using a voltage magnitude, a rate-of-change of power system voltage over time, a weighted rate-of-change of power system voltage over time, a current magnitude, a weighted current magnitude, and an impedance phasor value, to name a few.

The load shedding signal has a first logic state and a second logic state. The load is shed when the load shedding signal transitions from the first logic state to the second logic state (i.e., the load shedding signal is asserted). As the compensated value decreases, the load shedding time delay value decreases and the load shedding signal is asserted more quickly, and vice versa.

In accordance with one aspect of the invention, the compensated inverse-time undervoltage system determines a load shedding signal which is a function of a measured power system voltage phasor adjusted by a compensated current value that is itself adjusted by a weighting factor and an impedance phasor value. In accordance with another aspect of the invention, the compensated inverse-time undervoltage load shedding system determines a load shedding signal that is a function of the rate-of-change of measured power system voltage over time.

DESCRIPTION OF THE MULTIPLE EMBODIMENTS

The multiple embodiments of this invention relate to undervoltage load shedding systems including a compensation element and an inverse-time undervoltage element utilized in an electric power system control or protective device for coordinated, system-wide load shedding. Generally, system control or protective devices are used for protecting, monitoring, controlling, metering and/or automating electric power systems and associated transmission lines. These system control or protective devices may include protective relays, RTUs, PLCs, bay controllers, SCADA systems, general computer systems, meters, and any other comparable devices used for protecting, monitoring, controlling, metering and/or automating electric power systems and their associated transmission lines.

Although embodiments described herein are preferably implemented in protective relays, it is contemplated that the embodiments may also be implemented in any suitable system control or protective devices such as those described above. Further, each compensated inverse-time undervoltage element utilized in the embodiments described herein may operate independently from one another, without the need for control by external state simulation inputs or communication channels.

As previously mentioned, a definite time undervoltage relay utilized in a traditional UVLS systems includes a selectable preset voltage magnitude threshold and a timer having a selectable preset time interval. During operation, the timer begins counting when an input voltage magnitude (i.e., a measured power system voltage) drops below the preset voltage magnitude threshold. An associated relay is activated and its corresponding load is shed if the input voltage magnitude remains below the voltage magnitude threshold for the preset time interval.

An improvement over the definite time undervoltage relay, the inverse time undervoltage relay calculates a load shedding time delay that is a function of measured power system voltage at a particular bus. While both types of relays enable load shedding during power system voltage instability, both suffer from drawbacks.

Figure 1:
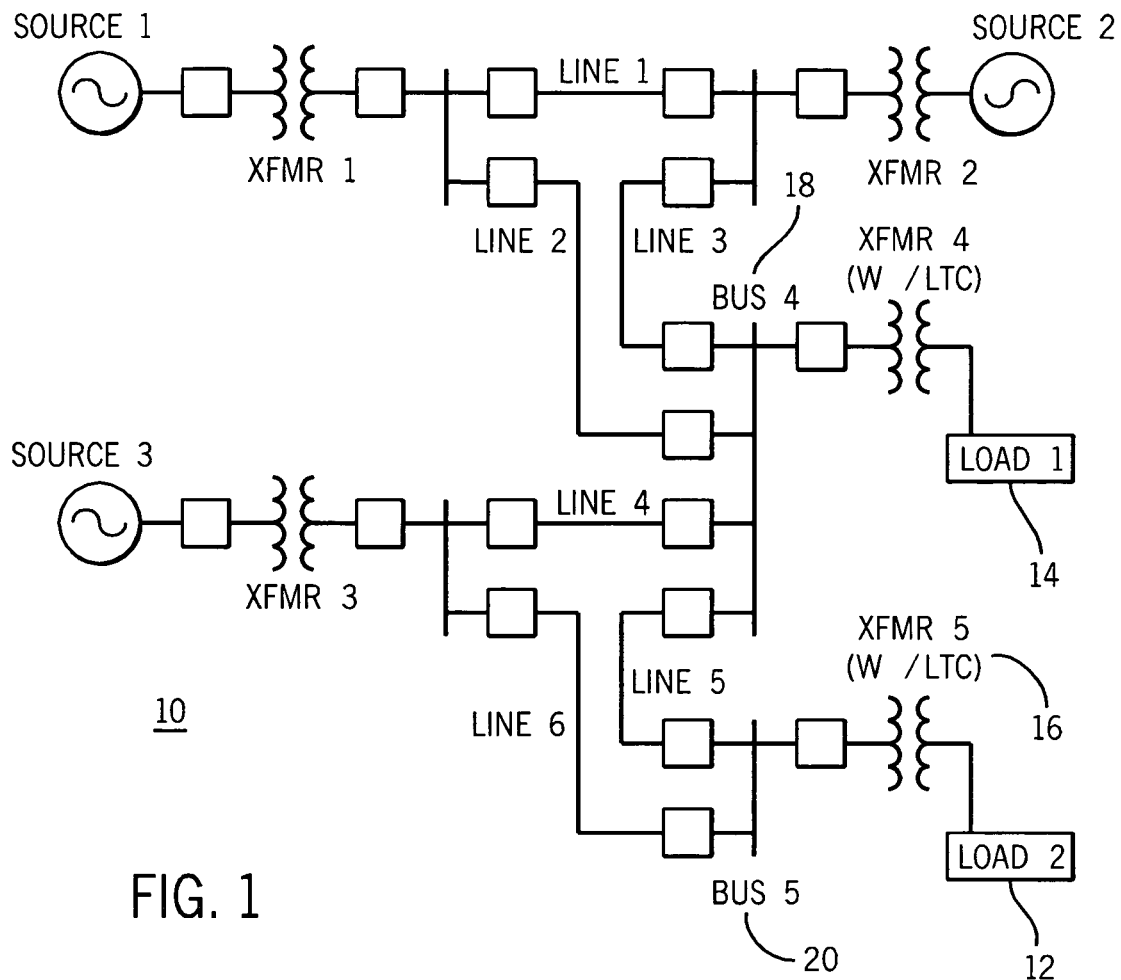
FIG. 1 is a schematic diagram of a power system that may be utilized in a typical metropolitan area.

For example, FIG. 1 is a schematic diagram of an electrical power system 10 that may be utilized in a typical metropolitan area. Referring to FIG. 1, Line 5 is assumed to be electrically short. Further, under nominal operating conditions, the voltages of the power system 10 are assumed to be within prescribed levels. During a power system voltage drop, the voltage levels at the various loads (e.g., Load 1 and Load 2) decrease with some voltage levels decreasing more than at others. As a result, voltage levels may vary from load to load. In the illustrated example, it is also assumed that Load 2 (12) is more demanding than Load 1 (14) during a voltage drop (i.e., Load 2 draws more current than Load 1). Moreover, it is assumed that definite time undervoltage relays and associated power circuit breakers are connected to Bus 4 (18) and Bus 5 (20).

If a reduction in power system voltage is detected, first stage corrective actions may be taken in an attempt to raise the power system voltage to its nominal voltage level. For example, shunt capacitors may be energized or placed online to raise the voltage level of Load 2 (12). Similarly, an LTC may be placed online at a power transformer 5 (16) to dynamically change load transformer turns ratios and raise the voltage level of Load 2 (12).

If these first stage corrective actions fail to restore nominal power system operating voltages, it may be necessary to shed one or more loads. Moreover, it is usual for bus voltages across a large portion of the power system 10 to decline to approximately the same voltage level during the undervoltage condition even though the loads may be drawing dissimilar power amounts from the power system 10. As is typically the case, the definite time undervoltage relays at Bus 4 (18) and Bus 5 (20) are configured with identical preselected voltage thresholds (e.g., 0.9 per unit nominal) and identical predetermined time periods (e.g., 2 seconds). If it is assumed that the measured input voltage at Bus 4 (18) declines to 0.85 per unit nominal and the measured input voltage at Bus 5 (20) declines to 0.80 per unit nominal, the timers of both relays begin counting. If both measured input voltages remain below the preselected voltage threshold for the predetermined time period, both Load 1 (14) and Load 2 (12) may be shed when shedding only one load (e.g., Load 2 (12)) may have been sufficient to restore nominal power system operating voltage conditions.

Previous attempts to address this problem of unnecessary load shedding have included setting multiple definite time undervoltage relays with different pickup voltage thresholds and different predetermined time periods, selected and coordinated for specific potential events and/or circumstances. Unfortunately, if the potential events and/or circumstances of system loading change, the planned coordination is relatively ineffective.

When load shedding is achieved using traditional definite time undervoltage relays or prior art inverse time undervoltage relays, care must be taken to ensure that they are employed properly. (See, "Undervoltage Load Shedding Guidelines" prepared by Western Electricity Coordinating Council's Undervoltage Load Shedding Task Force in July 1999, indicating that traditional UVLS systems require identifying—local areas, identifying—critical system buses, establishing minimum operating voltages for the worst single contingency, establishing minimum VAR requirements for the worst single contingency, and determining need for load dropping from PV curves.)

Moreover, because of the difficulty in configuring traditional definite time undervoltage relays or prior art inverse time undervoltage relays, they are generally used only on critical power system buses. Unfortunately, it is often difficult to predict which buses may or may not be critical in a dynamic environment.

It is also important to note that traditional definite time and inverse-time undervoltage relays may fail to account for high magnitude current conditions. Such high magnitude currents often accompany low voltage conditions during a power system voltage collapse and may result from power system controls attempting to maintain a constant power level condition. As power system controls attempt to maintain this constant power level, the system power and voltage levels decrease until they reach power equilibrium that may include unacceptably high current conditions. The high current conditions may overload transmission lines. Moreover, traditional definite time and inverse-time undervoltage relays may fail to adapt to various types of loads (e.g., inductive loads, capacitive loads, and resistive loads) unless these configurations are preset by the user.

Figure 2:
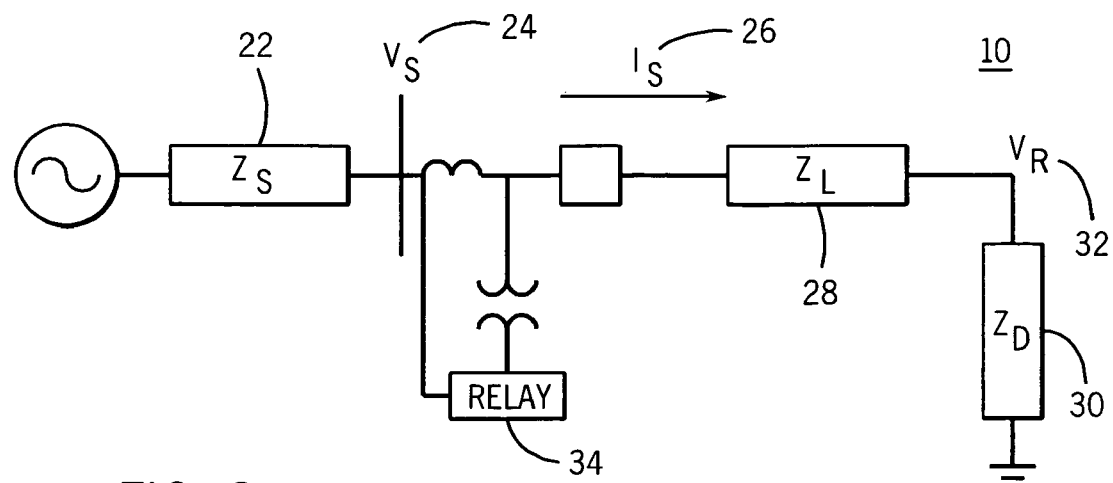
FIG. 2 is a more detailed schematic diagram of a portion of the power system of FIG. 1.

FIG. 2 is a more detailed schematic diagram of a portion of the power system of FIG. 1. In FIG. 2, $Z_S$ 22 represents a system source impedance; $V_S$ 24 represents a power system voltage at Bus 5; $I_S$ 26 represents a system source current; $Z_L$ 28 represents a line impedance associated therewith; $Z_D$ 30 represents a load impedance associated therewith; and $V_R$ 32 represents a load bus voltage magnitude associated therewith. A relay 34 is further provided to monitor and protect the power system portion of FIG. 3.

For example, referring to FIGS. 1 and 2, it may be assumed that Load 2 (12) is drawing more power from the power system 10 than Load 1 (14). It may also be assumed that $V_S$ (24) of FIG. 2 may represent the system source voltage on Bus 5 (20) of FIG. 1; $I_S$ (26) of FIG. 2 may represent the load current flowing from Bus 5 (20) to Load 2 (12); $Z_L$ (28) of FIG. 2 may represent the line impedance between Bus 5 (20) and Transformer 5 (16); $Z_D$ (30) of FIG. 2 may represent load impedance at Load 2 (12); and $V_R$ (32) of FIG. 2 may represent the primary bus voltage magnitude at Transformer 5 (16). In addition, both $V_S$ (24) and $I_S$ (26) are measured by relay 34 via associated transformers.

As mentioned above, during a period of voltage instability or voltage collapse, it is desirable to shed sufficient inductive, capacitive, and/or resistive loads such that the power system VAR generating sources match the power system VAR loads. Selecting which loads to shed and when to shed them is critical to minimizing power system disruption.

In accordance with the first aspect of the invention, there is provided a compensated inverse-time undervoltage system that determines a load shedding signal which is a function of a measured power system voltage phasor adjusted by a compensated current value that is itself adjusted by a weighting factor and an impedance phasor value where the impedance phasor value is selected to adapt to various types of loads.

Figure 3:
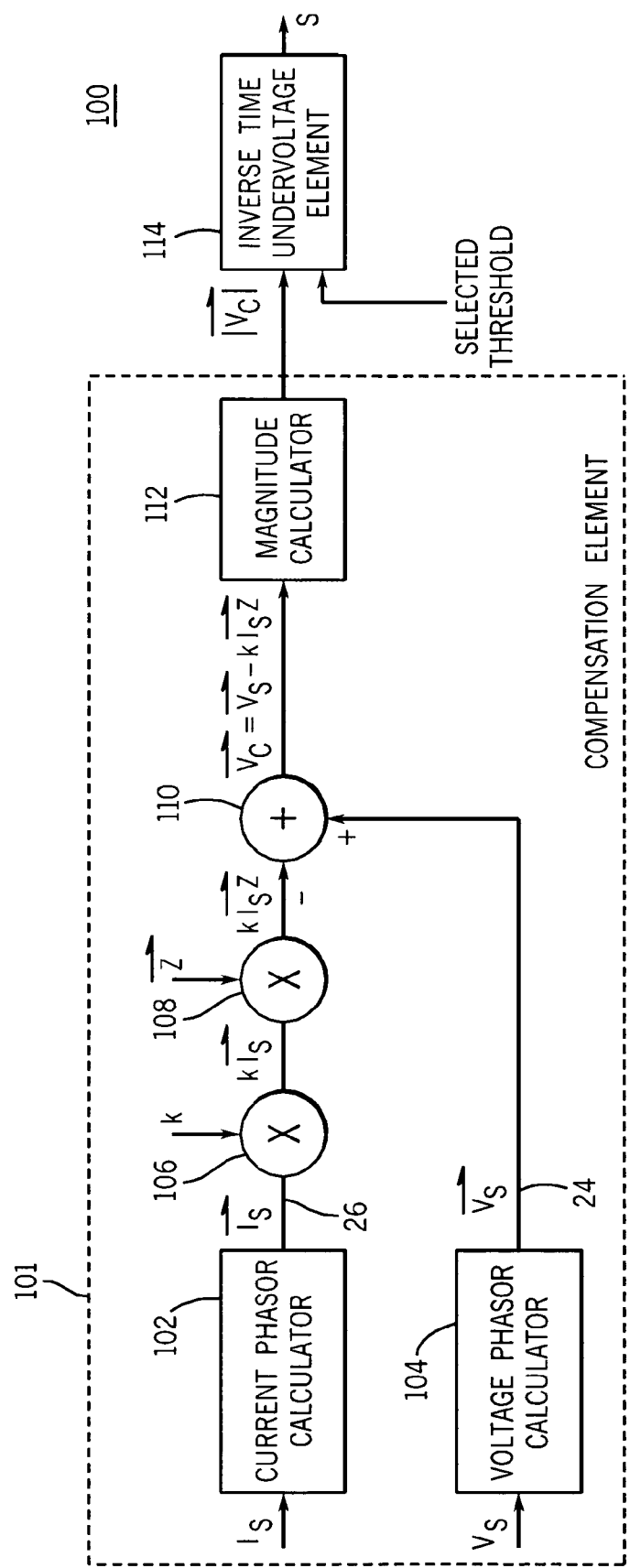
FIG. 3 is a functional block diagram of a compensated inverse-time undervoltage load shedding system according to an embodiment of the invention.

FIG. 3 is a functional block diagram of a compensated inverse-time undervoltage load shedding system 100 according to an embodiment of the invention. The system 100 utilizes the system load current and voltage when calculating a compensated value and an associated load shedding delay value, and when determining a logic state of a binary load shedding signal S based on the calculated load shedding delay value. The logic state of the binary load shedding signal S determines whether an associated load is shed. Further, the system 100 may be implemented in one of any number of system control or protective devices using software, hardware, firmware, or any combination thereof.

Referring to FIG. 3, the system 100 includes a compensation element 101 and an inverse time undervoltage element 114 coupled to the compensation element 101. The compensation element 101 includes a current phasor calculator 102 for measuring a power system current and calculating a current phasor $\overline{I_S}$ 26, a voltage phasor calculator 104 for measuring a power system voltage and calculating a voltage phasor $\overline{V_S}$ 24, a first multiplier 106 coupled to the output of the current phasor calculator 102, a second multiplier 108 coupled to the output of the first multiplier 106, an adder 110 coupled to the output of the second multiplier 108 and coupled to the output of the voltage phasor calculator 104, and a magnitude calculator 112 coupled to the output of the adder 110.

During operation, the compensation element 101 calculates a compensated voltage magnitude $|V_C|$. When enabled, the inverse-time undervoltage element 114 then calculates a load shedding time delay value t(V) based on the compensated voltage magnitude and then determines the binary load shedding signal S based on the load shedding time delay value. An associated load of the power system is shed when the logic state of the binary load shedding signal S transitions from a first to a second state as described below.

Figure 4:
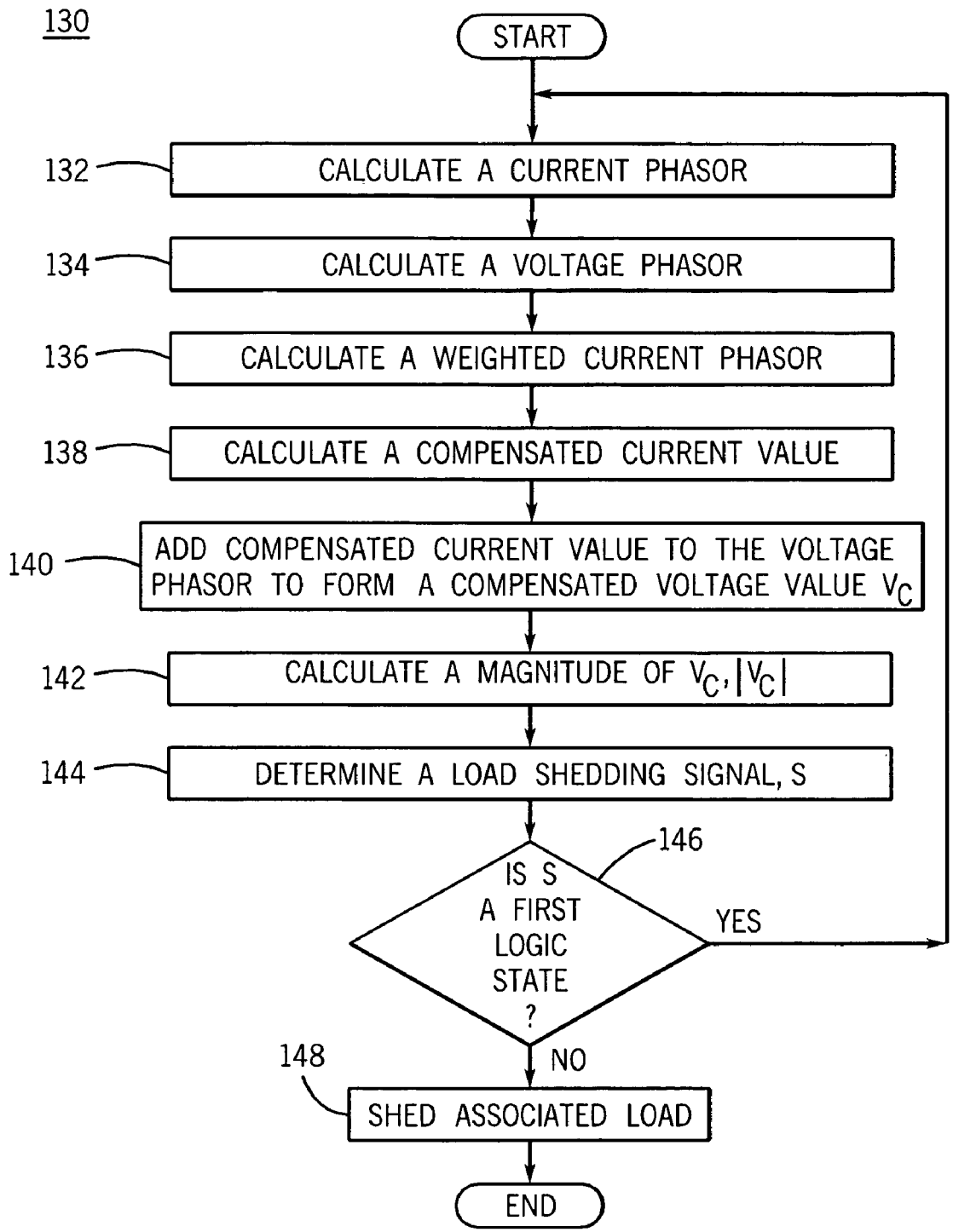
FIG. 4 is a flow chart of a method for calculating a load shedding time delay value and determining a load shedding signal using the system of FIG. 3.

For example, FIG. 4 is a flowchart of a method 130 for determining the logic state of the load shedding signal S using the system 100 of FIG. 3. The method 130 may be implemented in one of many types of system control or protective devices. For ease of discussion, the method 130 is preferably implemented in a microcontroller of the protective relay 34; however, the method 130 may be implemented via other elements of the protective relay 34 (e.g. a solid state element).

Referring to FIGS. 3 and 4, the method 130 begins when the current phasor calculator 102 measures a power system current and calculates the current phasor $\overline{I_S}$ 26 (step 132). The voltage phasor calculator 104 measures a power system voltage and calculates the voltage phasor $\overline{V_S}$ 24 (step 134). Next, the first multiplier 106 multiplies the current phasor $\overline{I_S}$ 26 by a weighting factor k, or scaling factor (step 136). The weighting factor k makes the compensated inverse-time undervoltage system 100 more or less sensitive to the measured power system current or current phasor $\overline{I_S}$ 26. The weighting factor k is preferably selected to be a value between 0.01 to 0.05; however, other suitable values are possible.

The resulting (k·$\overline{I_S}$) is then adjusted by a selected impedance phasor value $\overline{Z}$ to adapt to various types of loads (e.g., an inductive, a capacitive or a resistive load). The second multiplier 108 multiplies the resulting (k·$\overline{I_S}$) by the impedance phasor value $\overline{Z}$ to form a compensated current value k·$\overline{I_S}$ $\overline{Z}$ (step 138). Next, a compensated voltage value $\overline{V_C}$ is calculated when the adder 110 subtracts the compensated current value k·$\overline{I_S}$ $\overline{Z}$ from the voltage phasor $\overline{V_S}$ 24 (step 140) where $\overline{V_C} = \overline{V_S} - k \cdot \overline{I_S} \overline{Z}$.

Because the compensated voltage value $\overline{V_C}$ is preferably a phasor, the magnitude calculator 112 calculates the magnitude of the compensated voltage value |$V_C$| (compensated voltage magnitude |$V_C$|) (step 142). Next, using the compensated voltage magnitude |$V_C$|, the inverse time undervoltage element 114 calculates the load shedding time delay value t(V), and then determines the logic state of the binary load shedding signal S based on the load shedding time delay value t(V) (step 144). If the binary load shedding signal S has a first logic state (e.g., 0), an associated load of the power system is not shed. Conversely, if the binary load shedding signal S has a second logic state (e.g., 1), an associated load of the power system is shed (step 148).

Referring again to step 138, the impedance phasor value $\overline{Z}$ is selected, or chosen, to rotate current phasor $\overline{I_S}$ 26 with respect to the voltage phasor $\overline{V_S}$ 24 so that |$V_C$| is smaller when the current lags the voltage, and |$V_C$| is larger when the current leads the voltage.

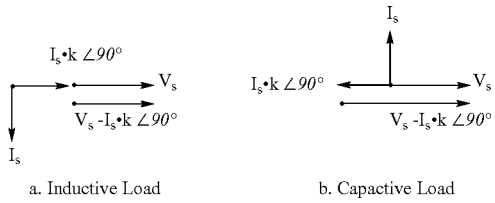

a. Inductive Load      b. Capacitive Load

Inductive loads cause current $\overline{I_S}$ 26 to lag voltage $\overline{V_S}$ 24, whereas capacitive loads cause current $\overline{I_S}$ 26 to lead voltage $\overline{V_S}$ 24. Therefore, the angle of rotation is chosen such that |$V_C$| is smaller when the load is inductive, and is larger when the load is capacitive. Although a magnitude of 1 at an angle of 90° is preferred for $Z_L$ 28, it is important to note that other magnitudes and angles may be substituted without deviating from the spirit of the invention. This phasor value for $Z_L$ 28, having a magnitude of 1 at an angle of 90°, will hereinafter be referred to as impedance phasor value $\overline{Z}$.

As previously mentioned, the compensated voltage magnitude |$V_C$| is used as an input to the inverse-time undervoltage element 114 to calculate the load shedding time delay value t(V). The logic state of the binary load shedding signal S is then determined based on the load shedding time delay value t(V). A decrease in |$V_C$| causes the load shedding time delay value t(V) to be smaller, and causes the binary load shedding signal S to assert faster (i.e., causes the logic state of the load shedding signal S to transition from the first state to the second logic state more quickly to shed an associated load) while an increase in |$V_C$| causes the load shedding signal S to assert slower (i.e., causes an associated load to shed more slowly or not at all).

More specifically, if current $\overline{I_S}$ 26 lags voltage $\overline{V_S}$ 24, (in, for example, an inductive load), the magnitude of $\overline{V_C} = \overline{V_S} - k \overline{I_S} \overline{Z}$, where $\overline{Z}$ is substantially 1 at an angle of 90°, is smaller than if current $\overline{I_S}$ 26 does not lag voltage $\overline{V_S}$ 24. Therefore, when current $\overline{I_S}$ 26 lags voltage $\overline{V_S}$ 24, the inverse time undervoltage element calculates a smaller load shedding delay value t(V) yielding a binary load shedding signal S that asserts more quickly than when current $\overline{I_S}$ 26 does not lag voltage $\overline{V_S}$ 24. Accordingly, if the load is inductive, it consumes VARs from the power system and tends to contribute to voltage decline, and should therefore be shed before other loads that do not consume VARS, or consume less VARs from the power system.

Conversely, if current $\overline{I_S}$ 26 leads voltage $\overline{V_S}$ 24, (in, for example, a capacitive load), the magnitude of $\overline{V_C} = \overline{V_S} - k \overline{I_S} \overline{Z}$, where $\overline{Z}$ is substantially 1 at an angle of 90°, is larger than if current $\overline{I_S}$ 26 does not lead voltage $\overline{V_S}$ 24. Therefore, when current $\overline{I_S}$ 26 leads voltage $\overline{V_S}$ 24 the inverse-time undervoltage element calculates a larger load shedding delay value t(V) and determines a load shedding signal S that asserts more slowly or not at all, than when current $\overline{I_S}$ 26 does not lead voltage $\overline{V_S}$ 24. If the compensated voltage magnitude |$V_C$| increases sufficiently when current $\overline{I_S}$ 26 leads voltage $\overline{V_S}$ 24, the inverse-time undervoltage element will not cause the associated load to be shed. Accordingly, if the load is capacitive, it supplies VARs to the power system and tends to oppose voltage decline (i.e., it tends to support a voltage increase), and should therefore either be shed after loads that do not supply VARs to the power system, or it should not be shed at all.

If current $\overline{I_S}$ 26 neither lags nor leads voltage $\overline{V_S}$ 24 but is substantially in phase with voltage $\overline{V_S}$ 24, (i.e., a resistive load), the magnitude of $\overline{V_C} = \overline{V_S} - k \overline{I_S} \overline{Z}$, where $\overline{Z}$ is substantially 1 at an angle of 90°, is smaller when the current $\overline{I_S}$ 26 is larger. Therefore, when current $\overline{I_S}$ 26 is in phase with voltage $\overline{V_S}$ 24 and current $\overline{I_S}$ 26 is relatively large, the inverse-time undervoltage element calculates a smaller load shedding delay value t(V) and yields a binary load shedding signal S that asserts more quickly than when current $\overline{I_S}$ 26 is relatively small. Accordingly, if the measured load current is relatively larger than other load currents of the power system, that load tends to contribute more to voltage decline and should therefore be shed before a load that has a relatively smaller load current.

Conversely, if current $\overline{I_S}$ 26 neither lags nor leads voltage $\overline{V_S}$ 24 but is substantially in phase with voltage $\overline{V_S}$ 24, the magnitude of $\overline{V_C} = \overline{V_S} - k \overline{I_S} \overline{Z}$, where $\overline{Z}$ is substantially 1 at an angle of 90°, is larger when the current is smaller. Therefore when current $\overline{I_S}$ 26 is in phase with voltage $\overline{V_S}$ 24 and current $\overline{I_S}$ 26 is relatively small, the inverse-time undervoltage element calculates a larger load shedding delay value t(V) and yields a binary load shedding signal S that asserts more slowly or not at all, than when current $\overline{I_S}$ 26 is relatively large. Accordingly, if the measured load current is relatively smaller than other load currents of the power system, that load tends to contribute less to voltage decline and should therefore be shed only after loads that have relatively larger load currents have been shed.

In an alternate embodiment, the load is shed more quickly for relatively large load currents, and shed more slowly or not at all for relatively small load currents when the load current $\overline{I_S}$ 26 is substantially in phase with the system voltage $\overline{V_S}$. In this embodiment, the impedance phasor value $\overline{Z}$ is selected to be substantially 1 at an angle of 0°. Selecting the impedance phasor value $\overline{Z}$ in this way places the compensated current value $k\,\overline{I_S}\,\overline{Z}$ substantially in phase with $\overline{V_S}$ 24 when $\overline{I_S}$ 26 is substantially in phase with $\overline{V_S}$ 24. This change in angle increases the magnitude of $\overline{V_C}=\overline{V_S}-k\,\overline{I_S}\,\overline{Z}$ when $\overline{I_S}$ is relatively small, and decreases the magnitude of $\overline{V_C}=\overline{V_S}-k\,\overline{I_S}\,\overline{Z}$ when $\overline{I_S}$ is relatively large.

It is important to note that there are also many alternate means for deriving a quantity for adjusting the measured voltage such that the resulting term is reduced for inductive loads and increased for capacitive loads. It is therefore important to note that Equation 1, and FIGS. 3 and 4 merely represent one manner among multiple others in which a compensated voltage $V_C$ may be calculated or derived. It is contemplated that other such equations for calculating the compensated voltage $V_C$ may also be derived by those skilled in the art (see, FIGS. 7 and 8). Moreover, the phase current and voltage terms utilized in Equation 1 may be replaced with positive-sequence or phase-phase quantities to achieve the similar results.

For example, Equation 2:

$$V_C = V_S \left(\frac{S}{V_S}\right)^* * k \angle 90°$$

represents another manner in which compensated voltage $V_C$ may be calculated. In this case, $$\left(\frac{S}{V_S}\right)^*$$

represents the complex conjugate of the system power divided by the measured system voltage where $S = P + jQ = V_S * I^*$.

Figure 5:
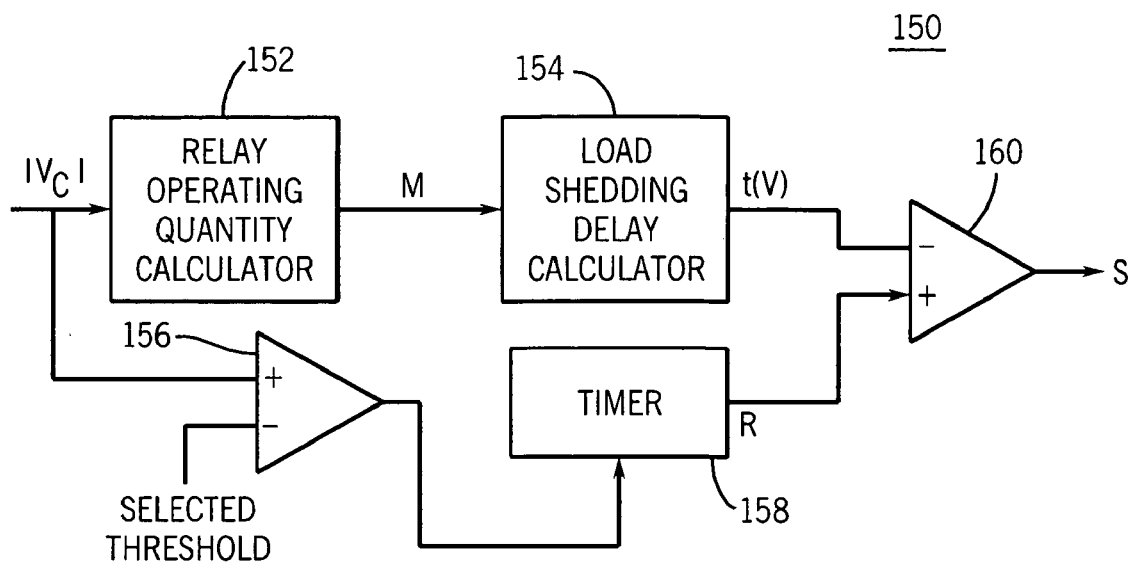
FIG. 5 is an exemplary inverse time undervoltage element that may be utilized in the systems of FIGS. 3 and 7.

Referring again to step 144 of FIG. 4, the inverse time undervoltage element 114 may determine the logic state of the binary load shedding signal S using one of many different methods. For example, FIG. 5 is a functional block diagram of an inverse time undervoltage element 150 that may be used in the compensated inverse-time undervoltage load shedding system of FIG. 3. The inverse time undervoltage element 150 includes a relay operating quantity calculator 152 that is configured to calculate a relay operating quantity M based on the compensated voltage magnitude $|V_C|$, and a load shedding delay calculator 154 coupled to the output of the relay operating quantity calculator 152. The load shedding delay calculator 154 is configured to calculate a tripping, or load shedding time delay value t(V). The inverse time undervoltage element 150 also includes a first comparator 156 that enables a timer 158 coupled to the first comparator 156. A second comparator 160 is coupled to the output of the timer 158 and to the output of the load shedding delay calculator 154, and is configured to determined whether the binary load shedding signal S remains in its "normal state", or first logic state, or whether the binary load shedding signal S transitions to its "shedding state," or second logic state. If transitioned to the second logic state, the binary load shedding signal causes, either directly or indirectly, an associated power circuit breaker or other load shedding element to shed the associated load (e.g., to open the breaker).

During operation of the inverse time undervoltage element 150, the relay operating quantity calculator 152 calculates the relay operating quantity M (defined by per-unit undervoltage measured) based on the compensated voltage magnitude $|V_C|$, where $$M = \frac{1 - \frac{V_c}{V_{nom}}}{1 - V_{pick}},$$

and where $V_{pick}$ represents a selected threshold voltage, or the minimum operating sensitivity of the protective device (e.g., the relay 34), and $V_{nom}$ represents a nominal power system voltage.

Next, the load shedding delay calculator 154 calculates the load shedding time delay value t(V), where $$t(V) = \left(\frac{A}{M^P - 1}\right) + B,$$

and where A represents a time setting on the relay, B represents a minimum time response value for the delay t(V), and P is a simple scalar (e.g., 0.02, 1, 2) where the value of P alters a Time-Voltage curve characteristic shape of the inverse-time undervoltage element 114. For example, useful values may include A=28, B=2, P=2 and $V_{pick}$=0.8, however, other values may be used.

The first comparator 156 then compares the compensated voltage magnitude $|V_C|$ to the selected threshold, $V_{Pick}$, where $V_{Pick}$ is the threshold value to enable timer 158 operation. If the compensated voltage magnitude $|V_C|$ is greater than the selected threshold $V_{Pick}$, the timer 158 is reset to zero, a starting value. If the compensated voltage magnitude $|V_C|$ is less than the selected threshold $V_{Pick}$, the timer 158 is incremented (i.e., the timer 158 is enabled, or allowed to run) and yields a timer output value R.

The second comparator 160, coupled to the timer 158 and the load shedding delay calculator 154, then compares the load shedding time delay value t(V) to the timer output value R. If the timer output value R is greater than the load shedding time delay value t(V), then the inverse time undervoltage element 150 times out, and the binary load shedding signal S transitions from the first logic state to the second logic state. The associated load is then shed. Conversely, if the timer output value R is less than the load shedding time delay value t(V), then the inverse time undervoltage element 150 does not time out, and the load shedding signal S remains in its first logic state. The associated load is not shed.

As illustrated in the above discussion, the timer 158 is enabled only if the compensated voltage magnitude $|V_C|$ is less than the threshold value $V_{Pick}$. In another embodiment, it is desirable to compare the threshold value $V_{Pick}$ to an uncompensated input voltage magnitude $|V|$. In that case, the timer 158 is enabled only if the uncompensated input voltage magnitude $|V|$ is less than threshold value $V_{Pick}$. This allows a uniform system wide voltage value to be used for parameter pickup rather than the disparate values possible for the compensated voltage magnitude $|V_C|$ across the power system.

Referring again to FIG. 5, it is possible that the configuration and operation of the timer 158 may cause premature or delayed inverse time undervoltage element 150 timeouts. For example, if the compensated voltage magnitude $|V_C|$ (or the voltage magnitude $|V|$) spikes above the threshold value $V_{Pick}$ while the timer 158 is running, the timer 158 may reset to zero and delay timeout of the inverse time undervoltage relay 150 indefinitely, even though the average compensated voltage magnitude $|V_C|$ is significantly less than the threshold value $V_{Pick}$. Alternatively, if the compensated voltage magnitude $|V_C|$ (or the voltage magnitude $|V|$) decreases significantly while the timer 158 is running such that the newly calculated load shedding delay value t(V) is less than the timer output value R, the inverse time undervoltage relay 150 can prematurely timeout as soon as the compensated voltage magnitude $|V|$ decreases.

In addition, it may be desirable to decrease the timer output value R by one rather than resetting the timer to zero each the time value input to the inverse time undervoltage element is less than $V_{pick}$, thereby allowing the timer to reset gradually.

Like the inverse time undervoltage element 150, the inverse time undervoltage element 170 includes the relay operating quantity calculator 152 configured to calculate the relay operating quantity M based on the compensated voltage magnitude $|V_C|$, the load shedding delay calculator 154 coupled to the output of the relay operating quantity calculator 152, and the first comparator 156 having a first input coupled to the input of the relay operating quantity calculator 152 and having a second input for receiving the threshold value $V_{Pick}$.

Unlike the inverse time undervoltage element 150, the inverse time undervoltage element 170 includes an accumulator sum element 172 coupled to the output of the load shedding delay calculator 154 and enabled by the first comparator 156. A second comparator 174 includes a first input coupled to the output of the accumulator 172, and a second input of one.

During operation of the inverse time undervoltage element 170, the relay operating quantity calculator 152 calculates the relay operating quantity M based on the compensated voltage magnitude $|V_C|$. Using the relay operating quantity M and values for A, B, P and $V_{pick}$, the load shedding delay calculator 154 calculates the load shedding time delay value t(V). Next, the first comparator 156 compares the compensated voltage magnitude $|V_C|$ to the threshold value $V_{Pick}$. If the compensated voltage magnitude $|V_C|$ is greater than or equal to the threshold value $V_{Pick}$, the accumulator sum element 172 is reset to zero, a starting value. If the compensated voltage magnitude $|V_C|$ is less than the threshold value $V_{Pick}$, an accumulated sum Σ of the accumulator sum element 172 is incremented by a value that is inversely proportional to the load shedding time delay value t(V) (i.e., the accumulator sum element 172 is enabled) and the accumulator sum element 172 calculates an accumulated sum $\Sigma_{new}$ where $$\sum_{new} = \sum_{old} + \frac{T}{t(V)}.$$

The second comparator 174 then compares the accumulated sum $\Sigma_{new}$ to one. If the accumulated sum $\Sigma_{new}$ is greater than, or equal to one, the second comparator 174 transitions the binary load shedding signal S from the first logic state to the second logic state (i.e., the inverse time undervoltage element 170 has timed out). The associated load is shed. If the accumulated sum $\Sigma_{new}$ is less than one, the second comparator 174 the binary load shedding signal S remains in the first logic state (i.e., the inverse time undervoltage element 170 has not timed out). The associated load is not shed.

The value $$\frac{T}{t(V)}$$

is added to the accumulated sum $\Sigma_{old}$ each time the compensated voltage magnitude $|V_C|$ is less than the threshold value $V_{Pick}$. The term T represents a processing period of the inverse time undervoltage element 170. For example, if the inverse time undervoltage element 170 is processed 60 times per second, then T=1/60.

Figure 6:
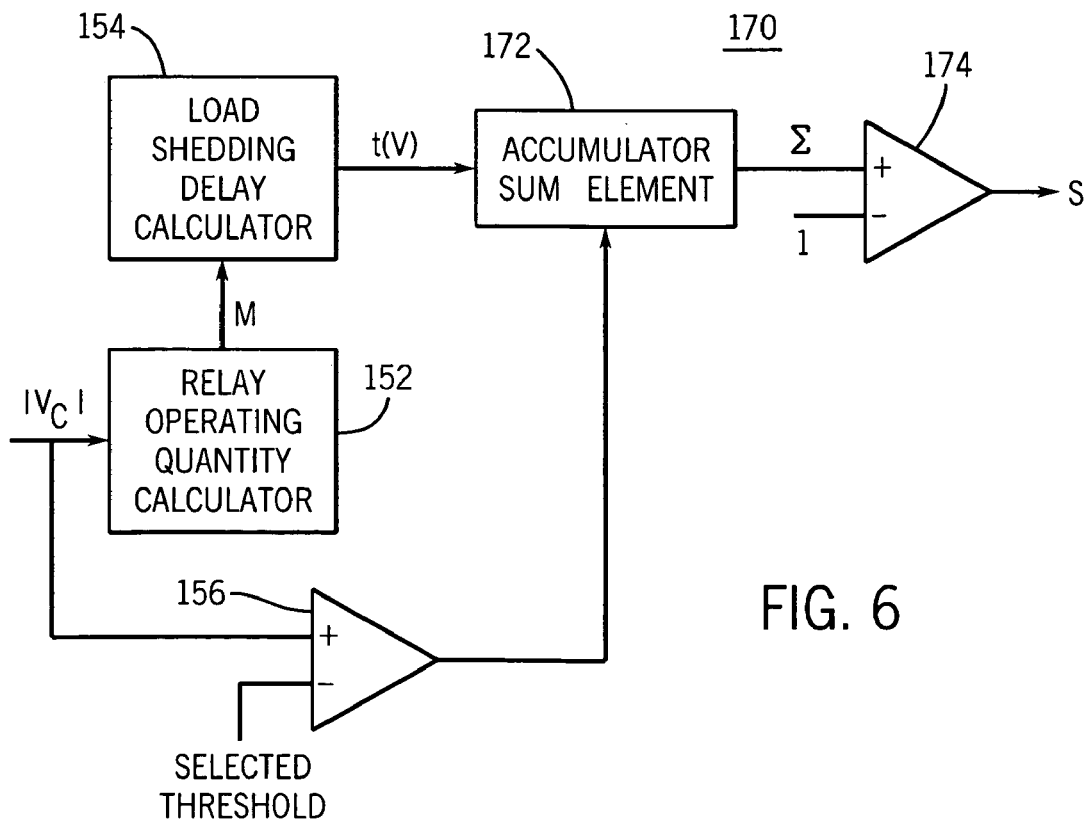
FIG. 6 is another exemplary inverse time undervoltage element that may be utilized in the systems of FIGS. 3 and 7.

As described in connection with FIG. 6, the accumulator sum element 172 is enabled when the compensated voltage magnitude $|V_C|$ is less than the threshold value $V_{Pick}$. In another embodiment, it is desirable to compare the threshold value $V_{Pick}$ to an uncompensated input voltage magnitude $|V|$. In that case, the accumulator sum element 172 runs only if the uncompensated input voltage magnitude $|V|$ is less than threshold value $V_{Pick}$. This enables a uniform system wide voltage value to be used for parameter $V_{Pick}$ rather than the disparate values possible for the compensated voltage magnitude $|V_C|$ across the power system.

In addition, it may be desirable to decrease the accumulated sum $\Sigma_{old}$ by some value that is inversely proportional to 1−t(V) rather than resetting the accumulator sum element 172 to zero each time the accumulator input to the inverse time undervoltage element is less than $V_{Pick}$, thereby allowing the accumulator sum element 172 to gradually reset.

Although only one equation for M is illustrated above, other equations for M are possible depending on the compensation method used to determine $V_C$. For example:

Equation 3:

$$M = \frac{1 - V_{pu}}{1 - Pickup} - k\frac{dV_{pu}}{dt}, \text{ and}$$

Equation 4:

$$M = \frac{1 - V_{pu} - k\frac{dV_{pu}}{dt}}{1 - Pickup}$$

In accordance with a second aspect of the invention, there is provided a compensated inverse-time undervoltage load shedding system that determines a load shedding signal which is a function of a rate-of-change of measured power system voltage over time.

Figure 7:
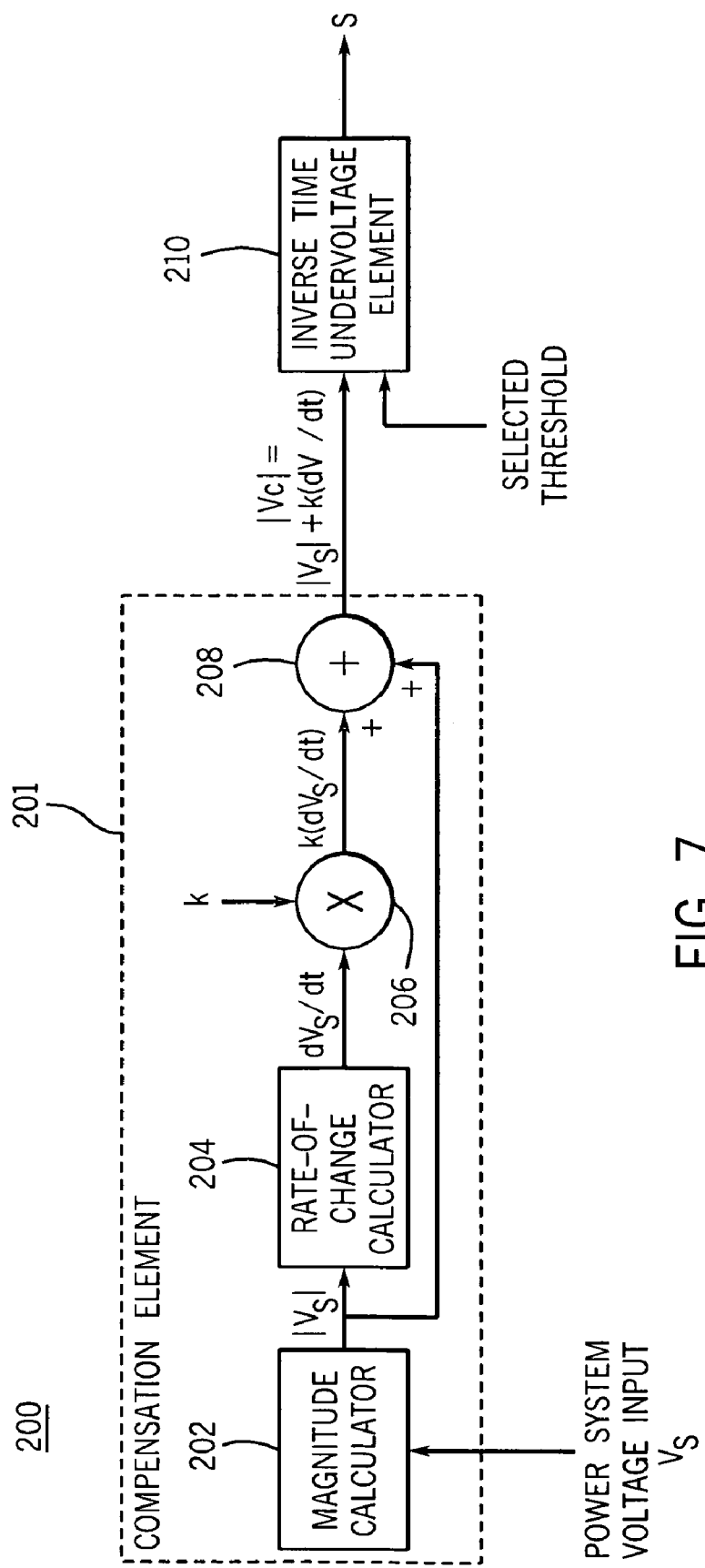
FIG. 7 is a functional block diagram of another compensated inverse-time undervoltage load shedding system according to another embodiment of the invention.

FIG. 7 is a functional block diagram of yet another compensated inverse-time undervoltage load shedding system 200 according to yet another embodiment of the invention. The system 200 utilizes the rate-of-change of measured power system voltage over time when calculating a compensated value and an associated load shedding delay, and when determining the logic state of the binary load shedding signal S based on the calculated load shedding time delay value. The logic state of the binary load shedding signal S determines whether an associated load is shed. Further, the system 200 may be implemented in one of any number of system control or protective devices using software, hardware, firmware, or any combination thereof.

Referring to FIG. 7, the system 200 includes a compensation element 201 and an inverse time undervoltage element 210 coupled to the compensation element 201. The compensation element 201 includes a magnitude calculator 202 having a power system voltage input, a rate-of-change calculator 204 having an input coupled to the magnitude calculator 202, a multiplier 206 having an input coupled to the rate-of-change calculator 204, and an adder 208 having one input coupled to the multiplier 206 and another input coupled to the magnitude calculator 202.

During operation, the compensation element 201 calculates a compensated voltage magnitude $|V_C|$. When enabled, the inverse-time undervoltage element 210 then calculates a load shedding time delay value t(V) based on the compensated voltage magnitude and then determines the binary load shedding signal S based on the load shedding time delay value. An associated load of the power system is shed when the logic state of the binary load shedding signal S transitions from the first to the second state as described below.

Figure 8:
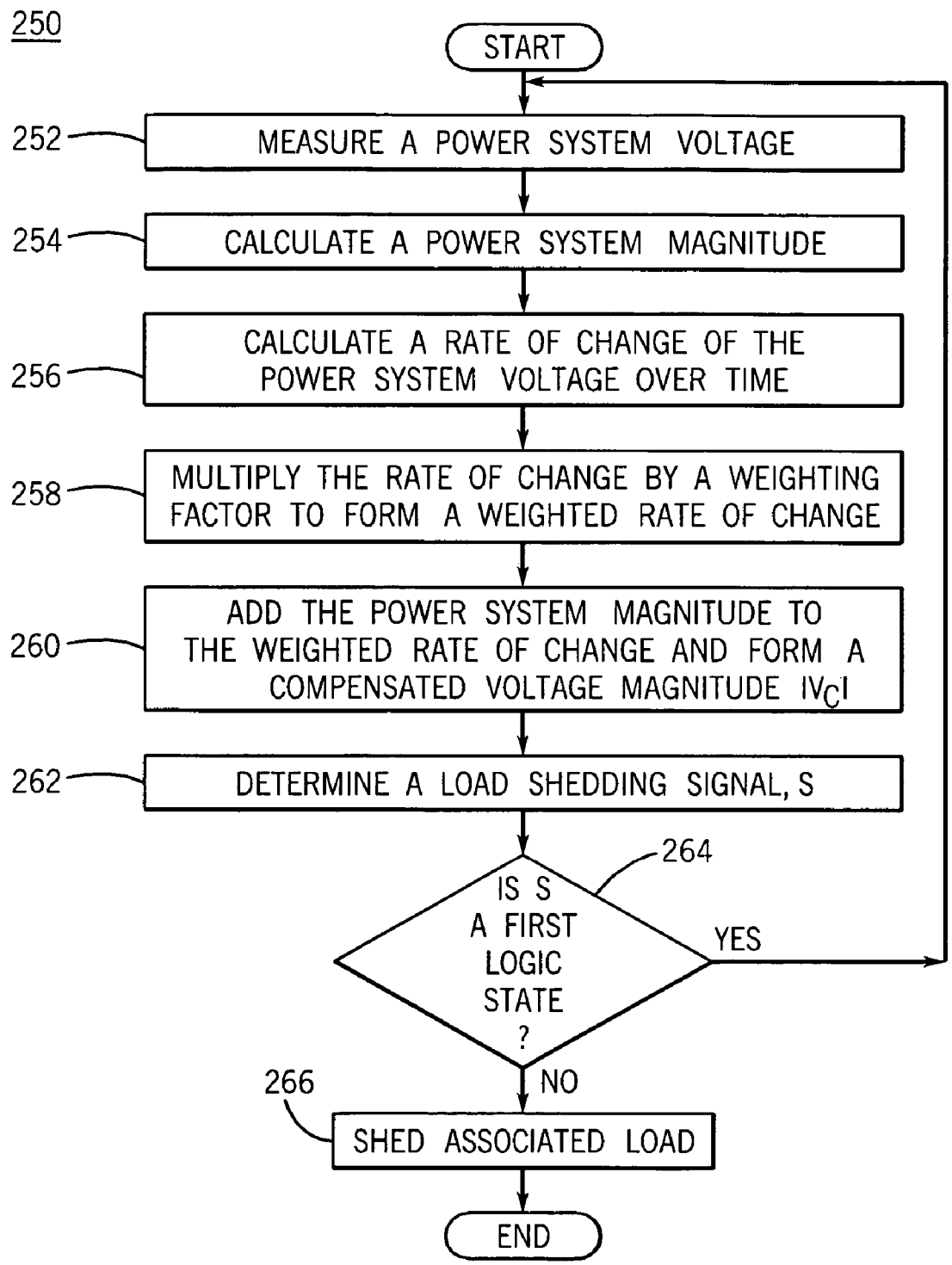
FIG. 8 is a flow chart of a method for calculating a load shedding time delay value and determining a load shedding signal using the system of FIG. 7.

FIG. 8 is a flowchart of a method 250 for determining the load shedding signal S using the system 200 of FIG. 7. The method 250 may be implemented in one of many types of system control or protective devices. For ease of discussion, the method 250 is preferably implemented in a microcontroller of the protective relay 34; however, the method 250 may be implemented via other elements of the protective relay 34.

Referring to FIGS. 7 and 8, the method 250 begins when the protective relay 34 measures a power system voltage $V_S$ (step 252). Upon measuring the power system voltage $V_S$, the magnitude calculator 202 calculates the magnitude of the power system voltage $|V_S|$ (step 254).

Utilizing the magnitude of the power system voltage $|V_S|$, the rate-of-change calculator 204 calculates a rate-of-change of the system voltage magnitude over time $$\left(\text{i.e., the derivative}\left(\frac{dV_s}{dt}\right)\right)$$

(step 256). If the power system voltage $V_S$ is increasing, $$\left(\frac{dV_s}{dt}\right) > 0,$$

whereas if the power system voltage $V_S$ is decreasing, $$\left(\frac{dV_s}{dt}\right) < 0.$$

Next, the rate-of-change of system voltage over time $$\left(\frac{dV_s}{dt}\right)$$

is multiplied by a weighting factor k to form a weighted rate-of-change of system voltage over time $$k\left(\frac{dV_s}{dt}\right)$$

(step 258). As mentioned in connection with FIG. 3, the value for the weighting factor k is preferably selected to be 0.01 to 0.05, depending on the desired impact of the rate-of-change of system voltage over time $$\left(\frac{dV_s}{dt}\right)$$

on the system 200. For example, when k is a larger value, the system 200 is more sensitive to the rate-of-change of system voltage over time $$\left(\frac{dV_s}{dt}\right).$$

Conversely, when k is a smaller value, the system 200 is less sensitive to the rate-of-change of system voltage over time $$\left(\frac{dV_s}{dt}\right).$$

The power system magnitude $|V_S|$ is then added to the weighted rate-of-change of system voltage over time $$k\left(\frac{dV_s}{dt}\right)$$

to form a compensated voltage magnitude $$\left(\text{i.e., } |V_c| = V + k\left(\frac{dV_s}{dt}\right)\right)$$

(step 260). As illustrated, the values for $V_S$, $$\left(\frac{dV_s}{dt}\right), k\left(\frac{dV_s}{dt}\right)$$

and $|V_C|$ are scalar values.

As described in detail above in connection with the inverse time undervoltage element 114, using the compensated voltage magnitude $|V_C|$, the inverse-time undervoltage element 210 first calculates the relay operating quantity M based on the compensated voltage magnitude $|V_C|$. Then using the relay operating quantity M and values for A, B, P and $V_{Pick}$, the load shedding delay calculator 154 (or equivalent) of the inverse-time undervoltage element 210 calculates the load shedding time delay value t(V). Based on a comparison the load shedding time delay value t(V) to another value, or based on another suitable mathematical operation using the load shedding time delay value t(V), the inverse-time undervoltage element 210 determines the logic state for the binary load shedding signal S.

Because $$\left(\frac{dV_s}{dt}\right) > 0$$

and $V_C>V_S$ the relay time operating quantity M decreases, thereby increasing the load shedding time delay value t(V). As a result, the load shedding signal S is less likely to be transitioned into its second logic state, or it is transitioned into its second logic state more slowly (i.e., asserts more slowly). Conversely, when the power voltage magnitude $|V_S|$ decreases, the load shedding time delay value t(V) decreases. Because $$\left(\frac{dV_s}{dt}\right) < 0$$

and $V_C<V_S$, the relay time operating quantity M increases $$\left(\text{above that for }\left(\frac{dV_s}{dt}\right) \geq 0\right),$$

thereby decreasing the load shedding time delay value t(V). As a result, the load shedding signal S is more likely to be transitioned quickly into its second logic state to cause the associated load to be shed. In other words, more rapid load shedding results for those loads exhibiting the largest voltage decreases over the shortest period of time, verses those loads exhibiting smaller voltage decreases over the same time period.

Although limited embodiments of the compensation element and the inverse time undervoltage element are presented herein, other embodiments of the compensated element in combination with other inverse-time undervoltage elements, including those described herein, are contemplated.

As may be apparent from the above discussion, the compensated inverse-time undervoltage load shedding systems and associated methods for calculating the timed output voltage enables efficient power system voltage collapse recovery by first shedding those loads demanding the most reactive power, thereby minimizing unnecessary load shedding.

The invention claimed is:

1. A compensated inverse-time undervoltage load shedding system for shedding a load in an electrical power system, the compensated inverse-time undervoltage load shedding system comprising:
    a compensation element for calculating a compensated value from an impedance phasor value; and
    an inverse-time undervoltage element in communicating relation with said compensation element, said inverse-time undervoltage element determining a load shedding signal based on a comparison of the compensated value with a predetermined threshold, wherein the load of the electrical power system is shed based on the load shedding signal,
    wherein the impedance phasor value is selected to prevent the load from shedding for a measured current of the electrical power system when a measured current value of the measured current is smaller than a selected current value and when the measured current is substantially in phase with a measured voltage of the electrical power system.

2. A compensated inverse-time undervoltage load shedding system for shedding a load in an electrical power system, the compensated inverse-time undervoltage load shedding system comprising:
    a compensation element for calculating a compensated value from an impedance phasor value; and
    an inverse-time undervoltage element in communicating relation with said compensation element, said inverse-time undervoltage element determining a load shedding signal based on a comparison of the compensated value with a predetermined threshold, wherein the load of the electrical power system is shed based on the load shedding signal,
    wherein the impedance phasor value is selected to cause the load to shed more slowly for a measured current of the electrical power system when a measured current value of the measured current is smaller than a selected current value and when the measured current is substantially in phase with a measured voltage of the electrical power system.

3. A compensated inverse-time undervoltage load shedding system for shedding a load in an electrical power system, the compensated inverse-time undervoltage load shedding system comprising:
    a compensation element for calculating a compensated value, comprising:
        a rate-of-change calculator adapted to calculate a rate-of-change over time; and,
        an adder coupled to the rate-of-change calculator, the adder adapted to add the rate-of-change over time to a magnitude to form the compensated value; and
    an inverse-time undervoltage element in communicating relation with said compensation element, said inverse-time undervoltage element determining a load shedding signal based on a comparison of the compensated value with a predetermined threshold, wherein the load of the electrical power system is shed based on the load shedding signal,
    wherein a smaller compensated value causes the load to shed more quickly than a larger compensated value.

4. The system of claim 3, wherein the compensation element determines the compensated value using a voltage magnitude.

5. The system of claim 3, wherein the compensation element determines the compensated value using a rate-of-change of a voltage magnitude over time.

6. The system of claim 3, wherein the compensation element determines the compensated value using a weighted rate-of-change of a voltage magnitude over time.

7. A compensated inverse-time undervoltage load shedding system for shedding a load in an electrical power system, the compensated inverse-time undervoltage load shedding system comprising:
    a compensation element for calculating a compensated value from an impedance phasor value; and
    an inverse-time undervoltage element in communicating relation with said compensation element, said inverse-time undervoltage element determining a load shedding signal based on a comparison of the compensated value with a predetermined threshold, wherein the load of the electrical power system is shed based on the load shedding signal,
    wherein the impedance phasor value is selected to cause the load to shed more quickly when a measured current of the electrical power system lags a measured voltage of the electrical power system than when the measured current does not lag the measured voltage.

8. A compensated inverse-time undervoltage load shedding system for shedding a load in an electrical power system, the compensated inverse-time undervoltage load shedding system comprising:
    a compensation element for calculating a compensated value from an impedance phasor value; and an inverse-time undervoltage element in communicating relation with said compensation element, said inverse-time undervoltage element determining a load shedding signal based on a comparison of the compensated value with a predetermined threshold, wherein the load of the electrical power system is shed based on the load shedding signal, wherein the impedance phasor value is selected to cause the load to shed more slowly when a measured current of the electrical power system leads a measured voltage of the electrical power system than when the measured current does not lead the measured voltage.

9. A compensated inverse-time undervoltage load shedding system for shedding a load in an electrical power system, the compensated inverse-time undervoltage load shedding system comprising:

a compensation element for calculating a compensated value from an impedance phasor value; and an inverse-time undervoltage element in communicating relation with said compensation element, said inverse-time undervoltage element determining a load shedding signal based on a comparison of the compensated value with a predetermined threshold, wherein the load of the electrical power system is shed based on the load shedding signal, wherein the impedance phasor value is selected to cause the load to shed more quickly for a measured current of the electrical power system when a measured current value of the measured current is larger than a selected current value and when the measured current is substantially in phase with a measured voltage of the electrical power system.

10. A method for undervoltage load shedding with a compensated inverse-time undervoltage load shedding system in an electrical power system, the method comprising:

calculating a rate-of-change of a magnitude over time;

adding the rate-of-change of the magnitude over time to the magnitude to form a compensated value;

enabling the inverse-time undervoltage element based on the compensated value; and, determining a load shedding signal by comparing the compensated value with a predetermined threshold, wherein a load of the electrical power system is shed based on the load shedding signal.

11. The method of claim 10, further comprising determining the compensated value using a rate-of-change of a voltage magnitude over time.

12. The method of claim 10, further comprising determining the compensated value using a weighted rate-of-change of a voltage magnitude over time.

13. A method for undervoltage load shedding with a compensated inverse-time undervoltage load shedding system in an electrical power system, the method comprising:

selecting an impedance phasor value to cause the load to shed more quickly when a measured current of the electrical power system lags a measured voltage of the electrical power system than when the measured current does not lag the measured voltage;

calculating a compensated value from the impedance phasor value;

enabling the inverse-time undervoltage element based on the compensated value; and, determining a load shedding signal by comparing the compensated value with a predetermined threshold;

wherein a load of the electrical power system is shed based on the load shedding signal.

14. A method for undervoltage load shedding with a compensated inverse-time undervoltage load shedding system in an electrical power system, the method comprising:

selecting an impedance phasor value to cause the load to shed more slowly when a measured current of the electrical power system leads a measured voltage of the electrical power system than when the measured current does not lead the measured voltage;

calculating a compensated value from the impedance phasor value;

enabling the inverse-time undervoltage element based on the compensated value; and, determining a load shedding signal by comparing the compensated value with a predetermined threshold, wherein a load of the electrical power system is shed based on the load shedding signal.

15. A method for undervoltage load shedding with a compensated inverse-time undervoltage load shedding system in an electrical power system, the method comprising:

selecting an impedance phasor value to cause the load to shed more quickly for a measured current of the electrical power system when a measured current value of the measured current is larger than a selected current value and when the measured current is substantially in phase with a measured voltage of the electrical power system;

calculating a compensated value from the impedance phasor value;

enabling the inverse-time undervoltage element based on the compensated value; and, determining a load shedding signal by comparing the compensated value with a predetermined threshold, wherein a load of the electrical power system is shed based on the load shedding signal.

16. A method for undervoltage load shedding with a compensated inverse-time undervoltage load shedding system in an electrical power system, the method comprising:

selecting an impedance phasor value to cause the load to shed more slowly for a measured current of the electrical power system when a measured current value of the measured current is smaller than a selected current value and when the measured current is substantially in phase with a measured voltage of the electrical power system;

calculating a compensated value from the impedance phasor value;

enabling the inverse-time undervoltage element based on the compensated value; and, determining a load shedding signal by comparing the compensated value with a predetermined threshold, wherein a load of the electrical power system is shed based on the load shedding signal.

17. A method for undervoltage load shedding with a compensated inverse-time undervoltage load shedding system in an electrical power system, the method comprising:

selecting an impedance phasor value to prevent the load from shedding for a measured current of the electrical power system when a measured current value of the measured current is smaller than a selected current value and when the measured current is substantially in phase with a measured voltage of the electrical power system;

calculating a compensated value from and the impedance phasor value;

enabling the inverse-time undervoltage element based on the compensated value; and, determining a load shedding signal by comparing the compensated value with a predetermined threshold, wherein a load of the electrical power system is shed based on the load shedding signal.

18. A method for undervoltage load shedding with a compensated inverse-time undervoltage load shedding system in an electrical power system, the method comprising:
calculating a current phasor;
calculating a voltage phasor;
multiplying the current phasor by an impedance phasor value to form a compensated current value
calculating a compensated value from the compensated current value;
subtracting the compensated current value from the voltage phasor to form a compensated voltage value;
enabling the inverse-time undervoltage element based on the compensated value; and,
determining a load shedding signal by comparing the compensated value with a predetermined threshold,
wherein a load of the electrical power system is shed based on the load shedding signal, and,
wherein a smaller compensated voltage value causes the load to shed more quickly than a larger compensated voltage value.

19. The method of claim 18, further comprising calculating a load shedding time delay value based on the compensated value, wherein the load shedding signal is determined based on the load shedding time delay value.

20. The method of claim 18, further comprising shedding the load when the load shedding signal transitions from a first logic state to a second logic state.

21. The method of claim 18, further comprising determining the compensated value using a current.

22. The method of claim 18, further comprising determining the compensated value using a weighted current.

23. The method of claim 18, further comprising selecting the impedance phasor value to prevent the load from shedding when a measured current of the electrical power system leads a measured voltage of the electrical power system.

24. The method of claim 18, wherein the compensated inverse-time undervoltage load shedding system is enabled based on the comparison of the compensated value and the predetermined threshold.

25. The method of claim 18, wherein the compensated value is a phase-to-phase value.

26. The method of claim 18, wherein the compensated value is determined from a positive sequence value.

27. The method of claim 18, wherein the compensated value is a phase value.

28. A compensated inverse-time undervoltage load shedding system for shedding a load in an electrical power system, the compensated inverse-time undervoltage load shedding system comprising:
a compensation element for calculating a compensated value, comprising:
a current phasor calculator adapted to calculate a current phasor;
a voltage phasor calculator adapted to calculate a voltage phasor;
a multiplier coupled to the current phasor calculator and adapted to multiply the current phasor by an impedance phasor value to form the compensated current value; and,
an adder coupled to the current phasor calculator and the voltage phasor calculator and adapted to subtract the compensated current value from the voltage phasor to form a compensated voltage value; and
an inverse-time undervoltage element in communicating relation with said compensation element, said inverse-time undervoltage element determining a load shedding signal based on a comparison of the compensated value with a predetermined threshold, wherein the load of the electrical power system is shed based on the load shedding signal,
wherein a smaller compensated voltage value causes the load to shed more quickly than a larger compensated voltage value.

29. The system of claim 28, wherein the inverse-time undervoltage element calculates a load shedding time delay value based on the compensated value, and wherein the load shedding signal is determined based on the load shedding time delay value.

30. The system of claim 28, wherein the inverse-time undervoltage element is enabled based on the compensated value.

31. The system of claim 28, wherein the load shedding signal has a first logic state and a second logic state, and wherein the load is shed when the load shedding signal transitions from the first logic state to the second logic state.

32. The system of claim 28, wherein the compensation element determines the compensated value using a current.

33. The system of claim 28, wherein the compensation element determines the compensated value using a weighted current.

34. The system of claim 28, wherein the impedance phasor value is selected to prevent the load from shedding when a measured current of the electrical power system leads a measured voltage of the electrical power system.

35. The system of claim 28, further comprising a first comparator for comparing the compensated value with the predetermined threshold, wherein said inverse-time undervoltage element is enabled based on the comparison of the compensated value and the predetermined threshold.

36. The system of claim 28, wherein the compensated value is determined from a positive sequence value.

37. The system of claim 28, wherein the compensated value is a phase value.

38. The system of claim 28, wherein the compensated value is a phase-to-phase value.

* * * * *

UNITED STATES PATENT AND TRADEMARK OFFICE
CERTIFICATE OF CORRECTION

PATENT NO. : 7,582,986 B2  Page 1 of 1
APPLICATION NO. : 10/961425
DATED : September 1, 2009
INVENTOR(S) : Folkers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 669 days.

Signed and Sealed this

Fourteenth Day of September, 2010

David J. Kappos
*Director of the United States Patent and Trademark Office*